(12) United States Patent
Overton

(10) Patent No.: US 6,324,307 B1
(45) Date of Patent: Nov. 27, 2001

(54) SYSTEM AND METHOD FOR REDUCING UNWANTED NOISE IN DIGITAL DATA

(75) Inventor: Mark Alan Overton, Escondido, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/163,783

(22) Filed: Sep. 30, 1998

(51) Int. Cl.[7] .................................................. G06K 9/40
(52) U.S. Cl. ............................................. 382/275; 382/237
(58) Field of Search .................................... 382/260–269, 382/274–275, 237; 358/431, 463, 1.9

(56) References Cited

U.S. PATENT DOCUMENTS 6,034,794 * 3/2000 Suganuma .............................. 358/518
6,087,673 * 7/2000 Shishido et al. ................... 250/559.45
6,107,637 * 3/2000 Watanabe et al. ................. 250/559.3

FOREIGN PATENT DOCUMENTS

11032218 * 2/1999 (JP) .

* cited by examiner

Primary Examiner—Thomas D. Lee
Assistant Examiner—Stephen Brinich

(57) ABSTRACT

A noise reduction system and method for reducing unwanted noise in digital data is disclosed. The system and method includes a noise reduction module having a noise estimation and reduction submodule. The noise estimation and reduction submodule can be any suitable submodule for receiving compressed data, estimating the amount of noise added due to data compression, and using the estimate to reset false gray pixels, thereby producing new data with reduced halos.

31 Claims, 4 Drawing Sheets

SYSTEM AND METHOD FOR REDUCING UNWANTED NOISE IN DIGITAL DATA

BACKGROUND OF THE INVENTION

1. Field of the Invention

The present invention relates in general to digital noise filters and in particular to a digital noise filtration system and method for reducing noise in digital data, such as compressed data.

2. Related Art

Data can be encoded and represented as compressed data so that less information (fewer bits) is used to store, transmit, or process the data more efficiently. After the compressed data is stored, transmitted, or is processed, it is decoded to obtain the original data. Since fewer bits represent the compressed data, less storage space is required to store the data and less time is required to transmit the data from one location to another. Thus, current data compression systems and methods are very important, useful and popular.

One popular type of data encoding system is JPEG compression (Joint Photographic Experts Group). JPEG encoding is usually employed for compressing digital image files. JPEG compression involves removing the least visible information in the image and can reduce the size of an image file by up to 100 times (100:1 compression ratio). The compression ratio of JPEG encoders is user selectable. The compression ratio is directly related to the quality of the image.

Typical JPEG encoders have four main steps. First a matrix of pixels, such as an 8×8 pixel block, is extracted from the image. Second, a discrete cosine transform (DCT) is calculated for the block. Third, coefficients of the DCT are rounded off by quantizers according to the desired compression ratio and the specified image quality. Fourth, the quantized coefficients are compressed using an encoding scheme such as Huffman coding or arithmetic coding. The final compressed code is then written to an output file or transmitted.

Although JPEG compression is an acceptable compression scheme for most compression ratios, problems arise with high compression ratios and highly compressed data. Namely, "halos" or "darkening effects" occur after high compression ratios are used for JPEG encoding. "Halos" or "darkening effects" are light gray patches surrounding text and other high-contrast areas in highly compressed JPEG data. In black text on white backgrounds, the light gray patches should be white areas. When printed, these gray patches result in the appearance of plural dots around the text, making it look fuzzy.

Since the color facsimile standard requires that each page be sent as JPEG data, documents with halos are prominent in color facsimile transmissions. For example, when image data is compressed enough so that a 4×6 inch photo can be sent in one minute, text looks exceptionally poor, primarily because of the surrounding halos. Therefore what is needed is a system and method that reduces halos and reduces stray dots around text in highly compressed data. Therefore, what is needed is a system and method for reducing unwanted noise in digital data. What is also needed is a system and method for reducing halos in encoded JPEG data.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a noise reduction system and method. The noise reduction system and method of the present invention reduces unwanted noise or "halos" surrounding text in highly compressed digital data.

The noise reduction system and method of the present invention includes a noise processing module having a noise estimation and reduction submodule. The noise estimation and reduction submodule can be a sort submodule, a multi-pass submodule, a peak submodule, an average submodule or a hybrid submodule comprised of some submodule combination thereof. The noise estimation and reduction submodule receives the decompressed data, estimates the amount of noise added due to JPEG compression, postulates which pixels were incorrectly set as gray (false gray pixels), and uses the estimate to reset the false gray pixels, thereby producing new data with reduced halos.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
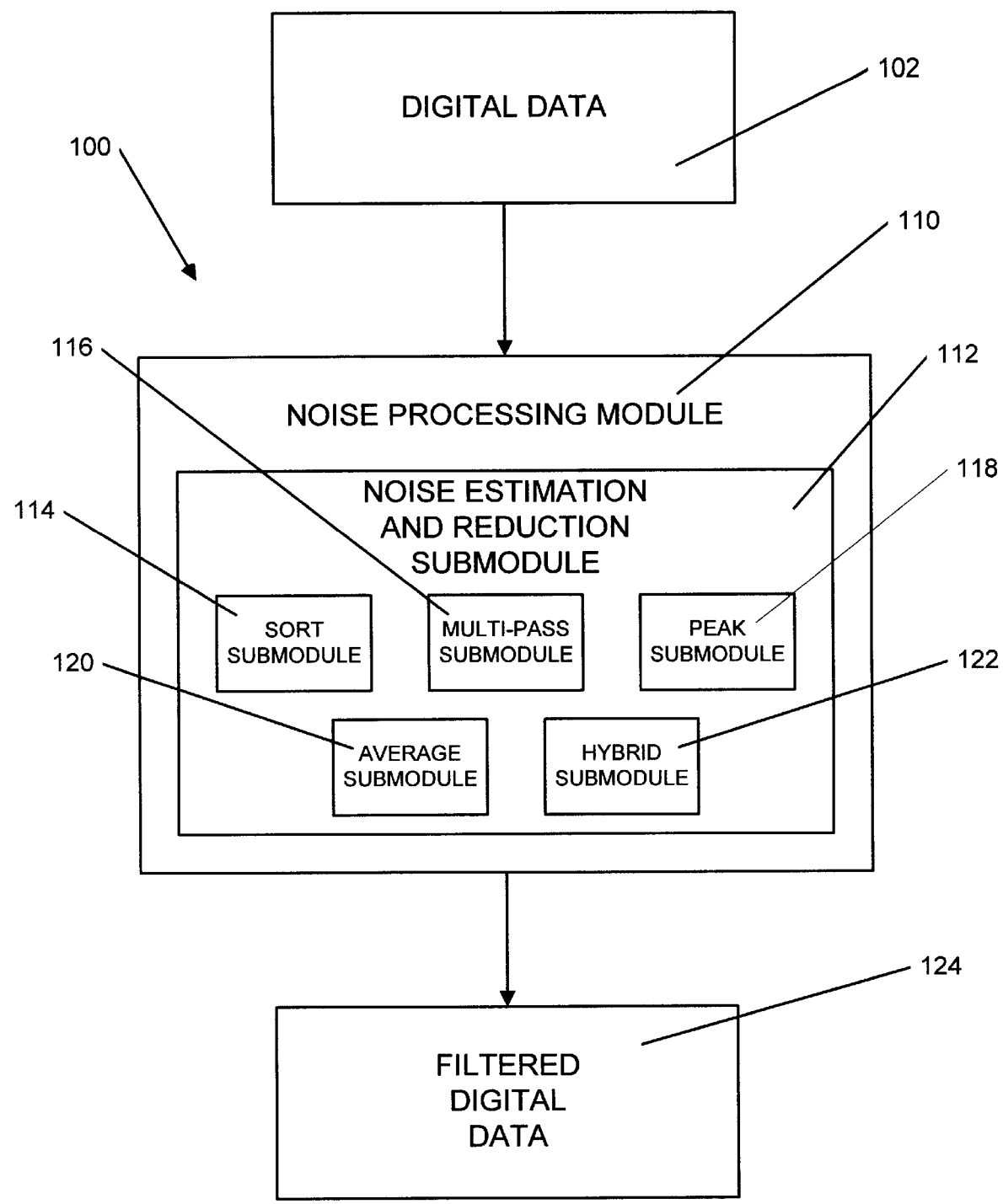
FIG. 1 is a block diagram illustrating a general overview of the system present invention.

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Introduction:

As shown in the drawings for the purposes of illustration, the invention is embodied in a novel noise reduction system and method. A system and method according to the invention reduces unwanted noise or "halos" surrounding text in highly compressed digital data, such as highly compressed JPEG files. The present invention also increases the visual quality of text, such as black on white, or white on black text, within highly compressed digital data. Existing data compression systems and methods have failed to reduce halos and unwanted noise surrounding text, which are typically caused, for example, by high compression ratios in JPEG files.

In JPEG files, the problem of halos arises because of quantization error in JPEG encoding, which produces errors in the magnitudes of frequencies used to encode data. As a result, when decoding and converting JPEG files from a frequency domain back to a spatial domain, these errors of magnitude are roughly equivalent to adding noise to the spatial domain data. For instance, with luminance data, maximum and minimum luminance values for any given pixel is typically 255 and 0, respectively. These errors cause some pixel luminance values to be incorrectly set below 255, thereby creating false gray pixels (gray is the luminance component of color) for color data. Also, the errors cause other pixel luminance values to be incorrectly set above 255. Most JPEG decoders clip, which causes pixels with values greater than 255 to be simply set to 255. However, the pixels with values less than 255 incorrectly remain at their respective values as the false gray pixels. In highly compressed JPEG data, many pixels are improperly set below their original values of 255 thereby creating unwanted halos. In general, a pixel has a range of valid values, and the maximum luminance can be at either end of that range.

A noise reduction system according to the invention reduces the unwanted halos surrounding text of highly compressed data, such as compressed JPEG luminance data, with a noise reduction module having a noise estimation and reduction submodule. The noise estimation and reduction submodule can be a sort submodule, a multi-pass submodule, a peak submodule, an average submodule or a hybrid submodule comprised of some submodule combination thereof. The noise estimation and reduction submodule receives the decompressed data, estimates the amount of noise added due to JPEG compression, postulates the false gray pixels, and uses the estimate to reset the false gray pixels, thereby producing new data with reduced halos. The noise estimate is based on the number and values of pixels exceeding 255.

Structural Overview:

Referring now to the drawings and more particularly to FIG. 1, there is shown a structural/functional overview of a noise reduction system 100, which is constructed in accordance with the present invention. Digital data 102 is sent to a noise processing module 110 of the system 100. The digital data 102 can be highly compressed data such as data image files compressed with a JPEG compression scheme. Although the noise processing module 110 can process chrominance data, luminance data is preferably processed. The noise processing module 110 processes the digital data 102 in accordance with the present invention.

The noise processing module 110 includes a noise estimation and reduction submodule 112. The noise estimation and reduction submodule 112 can be a sort submodule 114, a multi-pass submodule 116, a peak submodule 118, an average submodule 120, a hybrid submodule 122 comprised of a submodule combination of submodules 114, 116, 118, 120, or any suitable submodule for performing the processes of FIG. 2. The noise estimation and reduction submodule 112 produces filtered data 124 containing reduced halos surrounding text of the image caused by the compression scheme in accordance with the present invention.

Figure 2:
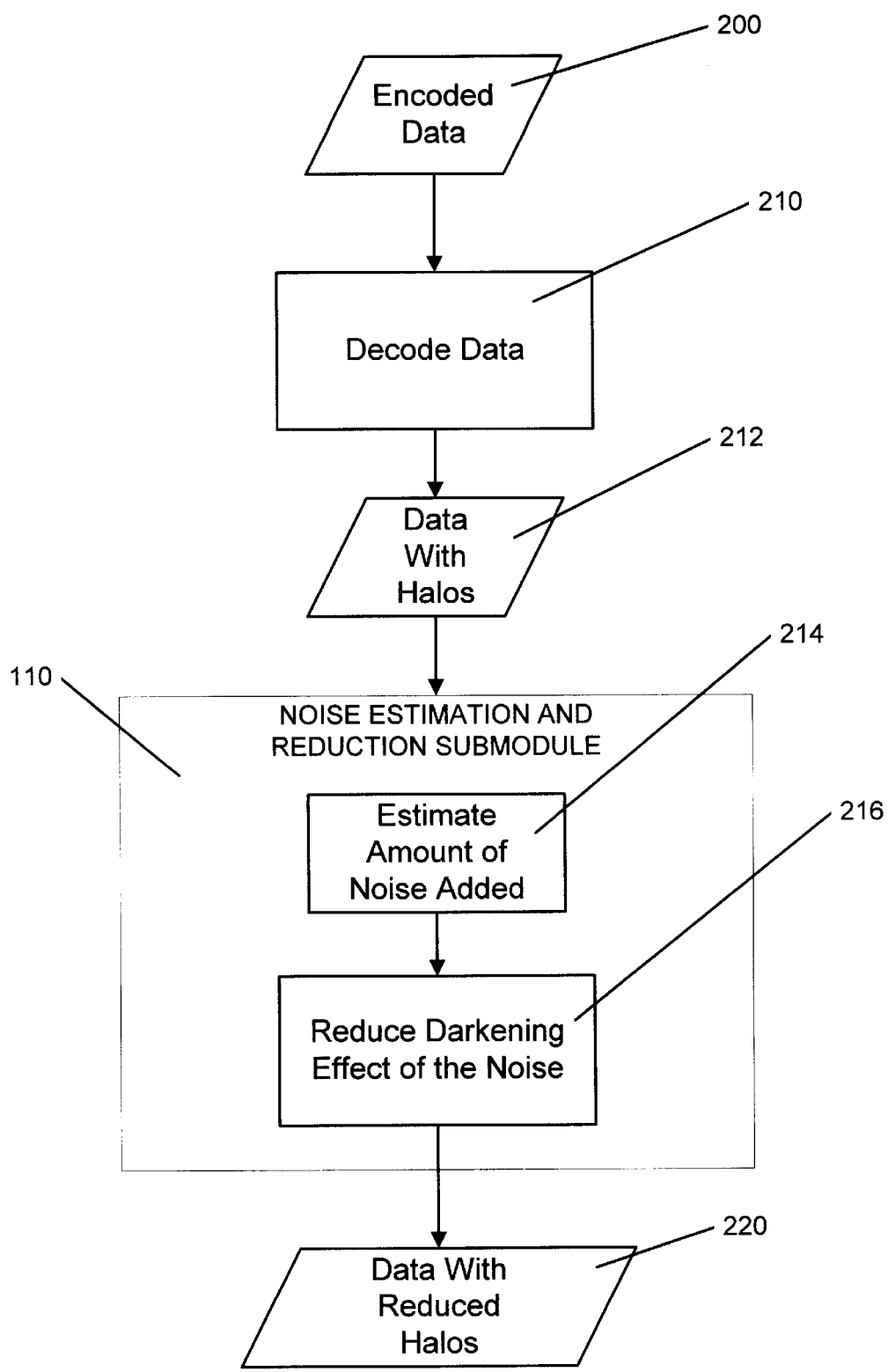
FIG. 2 is a flow diagram illustrating a general overview of the operation of the present invention.

Functional Overview:

FIG. 2 is a flow diagram illustrating a general overview of the functional operation of the present invention. First, encoded data (box 200) is received and decoded by a data compression scheme, such as JPEG (box 210). Data with halos (box 212), typically caused by encoded data that is highly compressed by the JPEG compression scheme, is sent to the noise processing module 110 of FIG. 1 and processed by the noise estimation and reduction submodule 112 of FIG. 1. The noise estimation and reduction submodule 112 estimates the amount of noise added by the compression scheme (box 214). This can be accomplished by, for example, examining and noting pixels with values over a threshold value, such as maximum luminance, and making an approximate estimate of added noise, such as white noise, based on the pixels with values over the threshold value. Next, the noise estimation and reduction submodule 112 of FIG. 1 uses the noise estimate to determine an appropriate amount to reduce darkening effects of the noise (box 216). This can be accomplished by, for example, first, locating lower pixels that have values below the threshold value or maximum luminance value; second, postulating (based on the noise estimate) and designating the lower pixels that should have been set at the maximum luminance value, but were reduced by the noise; and third, setting the designated pixels to the maximum luminance value. Since the halos are a product of darkening effects, appropriate reduction of the darkening effects produces new data with reduced halos (box 220).

Noise Estimation And Reduction Submodule:

The noise estimation and reduction submodule 112 of FIG. 1 can be any suitable submodule for performing the processes described above in FIG. 2. The description that follows presents several example noise estimation and reduction submodules for the purposes of illustration only and is not intended to be exhaustive nor to limit the invention to the precise form disclosed. Namely, the sort submodule 114, the multi-pass submodule 116, the peak submodule 118, the average submodule 120, and the hybrid submodule 122 of FIG. 1 are described in detail below.

All of the submodules may cause a side effect that involves reducing free anti-aliasing on line-edges that occurs when an image (such as a color image) is scanned. As a result, there may be increased jagged portions on the line-edges (commonly referred to as "jaggies") because with color data, light gray pixels are reset to white pixels with these submodules. However, the side effects seldom cause visible problems when printed since an error diffuser usually processes the pixels, thus, making it difficult or impossible for the human eye to notice the jaggies.

Figure 3:
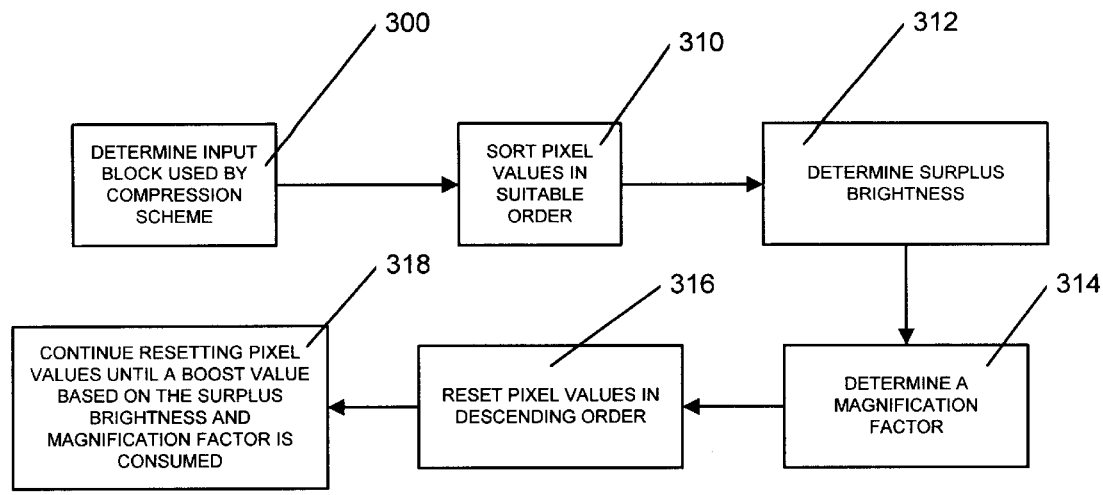
FIG. 3 is a flow diagram of a first embodiment (sorting method) of the present invention.

Sort Submodule:

FIG. 3 is a flow diagram of a first embodiment (sorting method) of the present invention. The sorting method utilizes surplus brightness determinations and magnification factors to reset pixel values for reducing and eliminating halos. The sorting method does not have any compromising side effects (other than the above-mentioned anti-aliasing side effect) and degradation does not occur in colored blocks, silk-screened areas, or with photo images.

Specifically, referring to FIG. 3, first, the number of pixels for each input block used by the compression scheme is determined (box 300). Typically, 64 pixels for an 8×8 matrix are used by a JPEG compression scheme. The 64 pixels are sorted in a suitable order, preferably descending, from the largest values to the smallest values (box 310). Although many sorting techniques can be used, a radix sort is preferred, which would require only 64 bytes of auxiliary memory and a small constant time per pixel. The 64 bytes of memory will typically store heads of linked-lists for pixel-values of 254 down to 191.

Next, a surplus brightness is determined (box 312) by adding amounts of all pixels exceeding 255, resulting in a SUM value. The SUM value represents the extra brightness that simple JPEG clipping would eliminate. A magnification factor, such as 3.0 or 3.5, is then determined (box 314). The magnification factor is an arbitrary value that is set high enough so that most of the false grays are reliably found. The SUM value is multiplied by the magnification factor, such as 3.0 or 3.5, to produce a BOOST value. The BOOST value is the amount of brightness that the sorting method will add to the image data to reduce the darkening effect and the halos.

Last, selected pixels are reset to a threshold value, such as a maximum luminance value of 255 (white), in descending order. For example, starting with the pixels that have a value of 254 and continuing on to pixels with values of 253, 252, etc., selected pixels are reset to values of 255. The difference of the threshold value, in this case 255, and the value of the selected pixel, is subtracted from the BOOST value until the BOOST value is zero or negative (box 318). Basically, the sorting method adds values of 255 back to the input block, starting with the lightest pixels that are not already 255 until the BOOST value is consumed. Preferably, pixels below a value of about 190 are not reset because doing so may erase light gray features that are not part of the halos, but instead gray features of the image data.

The magnification factor is relatively large because numerous pixels on the edges of text are falsely being reset to a value of 255. This resetting consumes part of BOOST, so BOOST needs to be larger than SUM to accommodate this resetting. Even though it is assumed that the lightest-valued pixels are all noise, which is seldom true, this allows the method to postulate which pixels originally had values of 255, but were reduced by noise after compression.

A variation of the sorting method would be to reduce auxiliary memory so that processing speed increases by sorting by value/2 or value/4 instead of the actual pixel value. Thus, only 32 or 16 bytes of auxiliary memory will be needed since small value-ranges are sorted instead of actual values.

Figure 4:
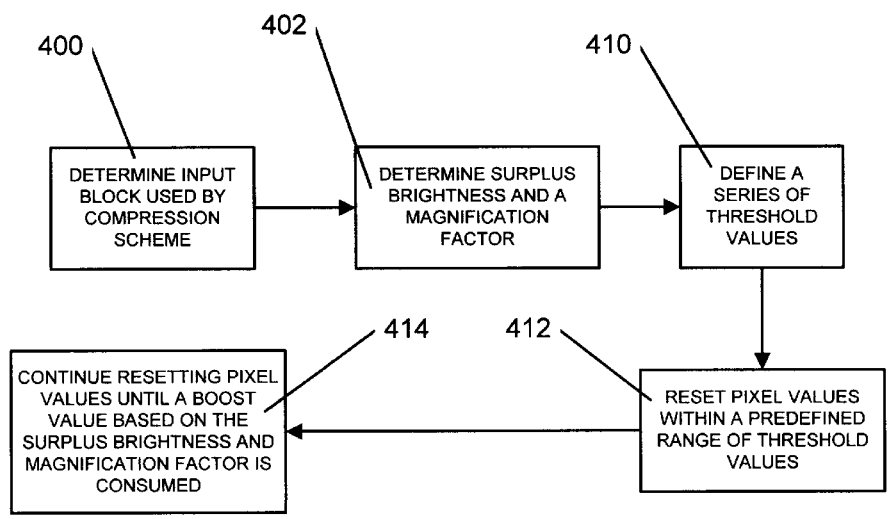
FIG. 4 is a flow diagram of a second embodiment (multi-pass method) of the present invention.

Multi-Pass Submodule:

FIG. 4 is a flow diagram of a second embodiment (multi-pass method) of the present invention. The multi-pass method utilizes magnification factors and threshold values to reset pixel values for reducing and eliminating halos. The multi-pass method also does not have any compromising side effects (other than the above-mentioned anti-aliasing side effect) and degradation does not occur in colored blocks, silk-screened areas, or with photo images. Specifically, referring to FIG. 4, first, the number of pixels for each input block used by the compression scheme is determined (box 400). A magnification factor and a SUM value is then determined to compute a BOOST value (box 402) in the same manner as described above for the sorting method of FIG. 3. Next, a series of threshold values, such as [250, 240, 230, 210, 190], are defined (box 410). Pixels with values greater than or equal to the series of threshold values are then set to values of 255 (box 412). For each such pixel, the difference of the threshold value, in this case 255, and the value of the selected pixel, is subtracted from the BOOST value until the BOOST value is zero or negative (box 414).

The multi-pass method of FIG. 4 is nearly as effective as the sorting method of FIG. 3. However, the multi-pass method takes slightly longer to reduce the halos because of the multiple passes.

Figure 5:
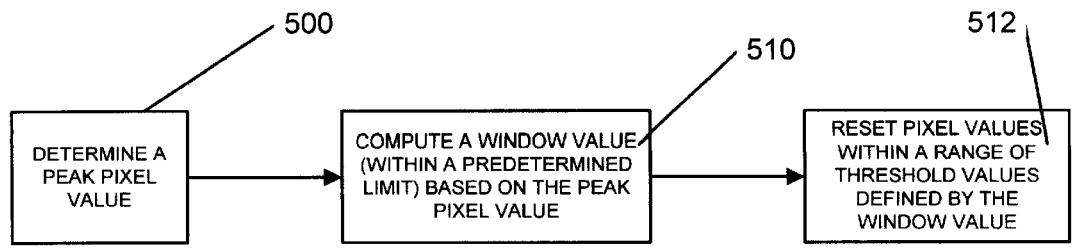
FIG. 5 is a flow diagram of a third embodiment (peak method) of the present invention.

Peak Submodule:

FIG. 5 is a flow diagram of a third embodiment (peak pass method) of the present invention. The peak pass method utilizes peak values and window values to reset pixel values for reducing and eliminating halos. Referring to FIG. 5, first, the pixel with the highest value is determined. For highly compressed JPEG data, the highest pixel value is typically a value that the JPEG scheme erroneously sets above the value of 255 (as discussed above) and is referred to as a PEAK value (box 500). Second, a window value or thresh-old value having a predetermined limit is computed based on the PEAK pixel value (box 510). The window value is computed by determining the difference between the PEAK value and some predetermined value, such as the value of 255, and adjusting this difference to produce the window value. The window value is used as a limitation between the value of 255 and a predetermined lower limit.

For example, the window value can be computed by, for instance, determining the difference between the PEAK value and the value of 255 and multiplying this difference by a magnifier, where the magnifier is an arbitrary number preferably between 1.25 and 1.5. This can be expressed as: window value=255−(PEAK−255) * Magnifier. Next, all pixels with values greater than or equal to the window value are reset to the value of 255 (box 512). Preferably, the window value is not set below a lower limit, such as 190 if the value of 255 is used.

The peak pass method is effective at reducing halos and requires no auxiliary memory. However, because it sweeps through the entire input block using a single threshold, and because scans of silk-screened images contain more noise than other images, light areas of these types of images may turn white, which can produce a blotchy appearance. Since scans of silk-screens are common (magazines and newspapers), this side effect can be reduced. Namely, this side effect can be limited by reducing the magnifier, which also reduces the effectiveness of halo-reduction. Depending on the image, optimization can be achieved by modifying and adjusting the magnifier.

Figure 6:
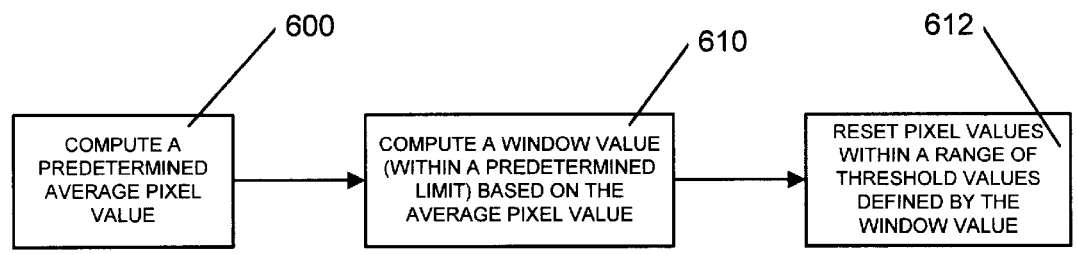
FIG. 6 is a flow diagram of a fourth embodiment (average method) of the present invention.

Average Submodule:

FIG. 6 is a flow diagram of a fourth embodiment (average method) of the present invention. The average method utilizes noise estimates and threshold values to reset pixel values for reducing and eliminating halos.

Referring to FIG. 6, first, an average pixel value is computed (box 600). The average pixel value is preferably an average of pixel values exceeding 255. Second, a window value or threshold value having a predetermined limit is computed based on the average pixel value (box 610). The window value is computed by determining the difference between the average value and the value of 255 and adjusting this difference to produce the window value. The window value is used as a limitation between the value of 255 and a predetermined lower limit.

For example, the window value can be computed, for instance, by determining the difference between the average value and the value of 255 and multiplying this difference by a magnifier, where the magnifier is an arbitrary number approximately equal to 3. This can be expressed as: window value=255−(average value−255) * Magnifier. Next, all pixels with values greater than or equal to the window value are reset to the value of 255 (box 612). Preferably, the window value is not set below a lower limit, such as 190 if the value of 255 is used.

The average method is almost as effective as the peak method, but suffers the same side effects, and has the further disadvantage of requiring a divide to compute the average.

Figure 7:
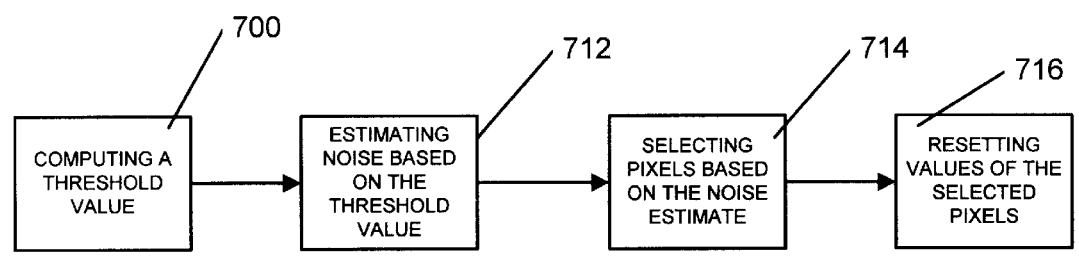
FIG. 7 is a flow diagram of another embodiment (hybrid method) of the present invention.

Hybrid Submodule:

FIG. 7 is a flow diagram of a fifth embodiment (hybrid method) of the present invention. The hybrid method can be plural hybrid combinations of the above methods of FIGS. 3–6 for resetting pixel values for reducing and eliminating halos.

Referring to FIG. 7, in general, the hybrid method can include computing a threshold value (box 700), estimating noise based on the threshold value (box 710), selecting pixels based on the noise estimate (box 712), and resetting values of the selected pixels (box 714). One example includes first computing a window or threshold value from the peak method of FIG. 5 or the average method of FIG. 6, and also computing a BOOST value from the sorting method of FIG. 3. Next, pixels at or above the window or threshold value are reset to the value of 255, as in the peak or average methods of FIGS. 5 and 6. Resetting would terminate when the BOOST value is consumed as in the sorting and multipass methods of FIGS. 3 and 4.

In addition, examination of the pixels could be performed in a pseudo-random order instead of simply left-to-right and top-to-bottom order. This would avoid lightening just the upper portions of the input block of tiles, which could produce horizontal white streaks in the Further, it should be noted that the peak method of FIG. 3 and the average method of FIG. 6 are methods of determining a fixed threshold and resetting pixels with values above the threshold to 255. There are other ways of setting such a threshold. For example, the threshold could be a function of the number of pixels that exceed 255. Since that number is in the range 0 to 64, the function can be implemented using an arbitrary table-lookup. Likewise, an arbitrary table-lookup function could be used to determine the PEAK value of the peak method of FIG. 5 or the average value of the average method of FIG. 6.

The foregoing description of the embodiments of the noise reduction system and method of the present invention for reducing unwanted noise in digital data has been presented for the purposes of illustration and description. They are not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for reducing noise from digital data comprised of data points, each data point having a value, the method comprising:
    estimating the noise by identifying and processing data points outside a valid range that is bounded by a maximum luminance value and a minimum value;
    using the noise estimate and the data point values to postulate noisy data points by selecting a portion of the data points with values near a boundary value of the valid range; and
    resetting the postulated data points to a value within the valid range by resetting the selected data points to the boundary value of the valid range.

2. The method of claim 1, wherein the data points are pixels.

3. The method of claim 1, wherein the noise is added by a JPEG compression scheme.

4. A computer-readable medium having computer-executable instructions for performing the method recited in claim 1.

5. The method of claim 3, wherein the noise is added by a quantizer.

6. The method of claim 3, wherein the noisy data points are pixels erroneously set by the compression scheme.

7. A computer-readable medium having computer-executable components for reducing noise added by a compressor, comprising:
    a noise estimation component adapted to receive compressor produced decompressed data comprised of data points with values for estimating the amount of noise added by the compressor by defining a peak reference value and computing a peak range based on the peak reference value and defined by a window value and a value within the valid range; and
    a filter component for postulating data points erroneously set and using the estimate to reset the values of the postulated data points to a boundary value within a valid range by resetting data points having values within the peak range to a boundary value of the valid range.

8. The computer-readable medium of claim 7, wherein the noise estimation component estimates noise by examining the number of data points and the values of data points outside the valid range.

9. The computer-readable medium of claim 7, wherein the valid range is bounded by a minimum luminance value and a maximum luminance value.

10. The computer-readable medium of claim 9, wherein the data points are pixels and the minimum luminance value is 0 and the maximum luminance value is 255.

11. The computer-readable medium of claim 7, wherein a decompressor erroneously sets the data points.

12. The computer-readable medium of claim 7, wherein the compressor is a JPEG compressor.

13. The computer-readable medium of claim 7, wherein the noise is added by a quantizer of the compressor.

14. The computer-readable medium of claim 7, wherein the noise estimation component is adapted to estimate noise by determining a surplus brightness defined by summed data point values outside the valid range, and wherein the filter component is adapted to sort data point values and reset sorted data points to a boundary value of the valid range until a predetermined value is reached.

15. The computer-readable medium of claim 14, wherein the surplus brightness is increased a predefined amount.

16. The computer-readable medium of claim 7, wherein the noise estimation component is adapted to estimate noise by defining a series of reference values, determining a surplus brightness defined by data point values outside the valid range, and wherein the filter component is adapted to reset data point values within the series of reference values to the boundary value of the valid range a predetermined value is reached.

17. The computer-readable medium of claim 16, wherein the surplus brightness is increased a predefined amount.

18. The computer-readable medium of claim 7, wherein the noise estimation component is adapted to estimate noise by defining an average reference value and computing an average range based on the average reference value and defined by a window value and a value within the valid range, and wherein the filter component is adapted to reset data points having values within the average range to the boundary value of the valid range.

19. A noise filter for reducing noise added by a compressor, comprising:
    a first processor for receiving compressor produced decompressed data comprised of data points with values;
    a second processor for estimating the amount of noise added by the compressor; and
    a third processor for postulating data points erroneously set and using the estimate to reset the values of the postulated data points to a boundary value within a valid range.

20. The noise filter of claim 19, wherein the second processor estimates noise by examining the number of data points and the values of data points outside the valid range.

21. The noise filter of claim 19, wherein the valid range is bounded by a maximum luminance value and a minimum value.

22. The noise filter of claim 19, wherein the valid range is bounded by a maximum value and a minimum luminance value.

23. The noise filter of claim 19, wherein the data points are pixels.

24. The noise filter of claim 19, wherein the compressor is a JPEG compressor.

25. The noise filter of claim 19, wherein the noise is added by a quantizer of the compressor.

26. The noise filter of claim 19, wherein the second processor is adapted to estimate noise by determining a surplus brightness defined by summed data point values outside the valid range, and wherein the third processor is adapted to sort data point values and reset sorted data points to a boundary value of the valid range until a predetermined value is reached.

27. The noise filter of claim 26, wherein the surplus brightness is increased a predefined amount.

28. The noise filter of claim 19, wherein the second processor estimates noise by defining a series of reference values, determines a surplus brightness defined by data point values outside the valid range, and wherein the third processor resets data point values of the series of reference values to a boundary value of the valid range until a predetermined value is reached.

29. The noise filter of claim 28, wherein the surplus brightness is increased a predefined amount.

30. The noise filter of claim 19, wherein the second processor is adapted to estimate noise by defining a peak reference value and computing a peak range based on the peak reference value and defined by a window value and a value within the valid range, and wherein the third processor is adapted to reset data points having values within the peak range to a boundary value of the valid range.

31. The noise filter of claim 19, wherein the second processor is adapted to estimate noise by defining an average reference value and computing a range based on the average reference value and defined by a window value and a maximum luminance value, and wherein the third processor is adapted to reset data points having values within the average range to a boundary value of the valid range.

* * * * *